United States Patent
Wang et al.

(10) Patent No.: US 11,997,284 B2
(45) Date of Patent: May 28, 2024

(54) METHOD FOR DERIVING MOTION VECTOR, AND ELECTRONIC DEVICE OF CURRENT BLOCK IN CODING UNIT

(71) Applicant: PEKING UNIVERSITY SHENZHEN GRADUATE SCHOOL, Guangdong (CN)

(72) Inventors: Ronggang Wang, Guangdong (CN); Xi Xie, Guangdong (CN); Kui Fan, Guangdong (CN); Wen Gao, Guangdong (CN)

(73) Assignee: PEKING UNIVERSITY SHENZHEN GRADUATE SCHOOL, Guangdong (CN)

( * ) Notice: Subject to any disclaimer, the term of this patent is extended or adjusted under 35 U.S.C. 154(b) by 289 days.

(21) Appl. No.: 17/645,698

(22) Filed: Dec. 22, 2021

(65) Prior Publication Data
US 2022/0191503 A1    Jun. 16, 2022

Related U.S. Application Data

(63) Continuation-in-part of application No. PCT/CN2019/102748, filed on Aug. 27, 2019.

(30) Foreign Application Priority Data

Aug. 19, 2019 (CN) .................. 201910766509.X

(51) Int. Cl.
| H04N 19/105 | (2014.01) |
| H04N 19/137 | (2014.01) |
| H04N 19/159 | (2014.01) |
| H04N 19/176 | (2014.01) |
| H04N 19/80  | (2014.01) |

(52) U.S. Cl.
CPC ......... H04N 19/137 (2014.11); H04N 19/105 (2014.11); H04N 19/159 (2014.11); H04N 19/176 (2014.11); H04N 19/80 (2014.11)

(58) Field of Classification Search
CPC .. H04N 19/137; H04N 19/105; H04N 19/159; H04N 19/176; H04N 19/80
(Continued)

(56) References Cited

U.S. PATENT DOCUMENTS

2012/0134415 A1* 5/2012 Lin .................. H04N 19/517
                                                     375/E7.243
2018/0035127 A1* 2/2018 Fuldseth ............ H04N 19/176

FOREIGN PATENT DOCUMENTS

| CN | 102883161 A | 1/2013 |
| CN | 103229504 A | 7/2013 |

(Continued)

OTHER PUBLICATIONS

International Search Report (with English Abstract) and Written Opinion issued in PCT/CN2019/102748, dated May 18, 2020.
(Continued)

*Primary Examiner* — Ayman A Abaza
(74) *Attorney, Agent, or Firm* — HSML P.C.

(57) ABSTRACT

A method for deriving motion vector is provided, this method includes: obtaining a space domain motion vector prediction and a time domain motion vector prediction of adjacent blocks of a coding unit in a predetermined direction; performing a filtering operation on the space domain motion vector and the time domain motion vector prediction to obtain the space domain motion vector prediction and the time domain motion vector prediction of the filtered adjacent blocks; determining, according to a predetermined inter-frame prediction mode, reference motion vectors of a current block in four side directions by using the space domain motion vector prediction and the time domain motion vector prediction of the filtered adjacent blocks and a coordinate position of the current block in the coding unit; and deriving motion vectors of the current block according to the refer-
(Continued)

ence motion vectors and the coordinate position of the current block in the coding unit.

12 Claims, 4 Drawing Sheets

(58) Field of Classification Search
USPC .................................................. 375/240.02
See application file for complete search history.

(56) References Cited

FOREIGN PATENT DOCUMENTS

| CN | 103583047 | A | 2/2014 |
|---|---|---|---|
| CN | 105959699 | A | 9/2016 |
| CN | 107181959 | A | 9/2017 |
| CN | 108347616 | A | 7/2018 |
| CN | 109005412 | A | 12/2018 |
| KR | 101676791 | B1 | 11/2016 |
| WO | 2016008161 | A1 | 1/2016 |

OTHER PUBLICATIONS

Thirumalai et al., "Inter-view motion vector prediction for depth coding", IEEE International Conference on Multimedia and Expo (ICME), Jul. 2014, 7 pages provided.

Guo et al., "Improved Method of H.264 Fast Motion Estimation Using Predictive Motion Vector", Journal of Data Acquisition and Processing, vol. 32, No. 2, Mar. 2017, pp. 278-285, with English Abstract provided.

* cited by examiner

METHOD FOR DERIVING MOTION VECTOR, AND ELECTRONIC DEVICE OF CURRENT BLOCK IN CODING UNIT

CROSS-REFERENCE TO RELATED APPLICATION

This application is a continuation-in-part of International patent application Serial No. PCT/CN2019/102748, with an international filing date of Aug. 27, 2019, which claims priority to Chinese patent application No. 201910766509.X filed on Aug. 19, 2019 and entitled "method and device for deriving motion vector, and electronic device", the contents each of which are incorporated herein by reference thereto.

TECHNICAL FIELD

The present disclosure relates to the technical field of video encoding and video decoding, and particularly relates to a method for deriving motion vector, and an electronic device.

BACKGROUND

Since there exists a strong time correlation between some consecutive frames of images in a video, when a video encoding is performed, inter-frame prediction techniques may be used to reduce redundancy between video frames according to the time correlation between the video frames, thereby achieves the purpose of removing redundancy of time domain of video effectively. In the existing inter-frame prediction technology, a Skip/Direct mode is taken as an example, the Skip/Direct mode is used to directly derive motion information of the current coding unit by utilizing the motion information of the coded adjacent blocks in space domain and the motion information in the encoded image in time domain. Therefore, although the Skip/Direct mode improves the coding efficiency to a certain extent, this method of deriving motion information only by virtue of the motion information in the coded adjacent blocks or the coded image reduces the accuracy of inter-frame prediction, In addition, the Skip/Direct mode finally derives all motion information of the current coding unit, thereby further reducing the accuracy of inter-frame prediction, and further affecting the coding efficiency.

In view of above problems, there is a need to provide a motion vector deriving method that can improve the accuracy of inter-frame prediction and further improve the coding efficiency.

SUMMARY

In view of this, an objective of the present disclosure is to provide a method for deriving motion vector, a device for deriving motion vector and an electronic device, which aims to solve a problem in the related art that the method of deriving motion information only by virtue of the motion information in the coded adjacent blocks or the coded image reduces the accuracy of inter-frame prediction, and thereby affects the encoding efficiency.

In order to solve the aforesaid technical problem, the embodiments of the present disclosure are implemented in this way:

A method for deriving motion vector is provided by the present disclosure, this method includes:

obtaining a space domain motion vector prediction and a time domain motion vector prediction of adjacent blocks of a coding unit in a predetermined direction;

performing a filtering operation on the space domain motion vector and the time domain motion vector prediction to obtain the space domain motion vector prediction and the time domain motion vector prediction of the filtered adjacent blocks;

determining, according to a predetermined inter-frame prediction mode, reference motion vectors of a current block in four side directions by using the space domain motion vector prediction and the time domain motion vector prediction of the filtered adjacent blocks and a coordinate position of the current block in the coding unit; and deriving motion vectors of the current block according to the reference motion vectors and the coordinate position of the current block in the coding unit.

One embodiment of the present disclosure provides an electronic device, including a memory, a processor and a computer program stored in the memory and executable by the processor, when the computer program is executed by the processor, the processor is caused to implement a method for deriving motion vector, including following steps of:

obtaining a space domain motion vector prediction and a time domain motion vector prediction of adjacent blocks of a coding unit in a predetermined direction;

performing a filtering operation on the space domain motion vector and the time domain motion vector prediction to obtain the space domain motion vector prediction and the time domain motion vector prediction of the filtered adjacent blocks;

determining, according to a predetermined inter-frame prediction mode, reference motion vectors of a current block in four side directions by using the space domain motion vector prediction and the time domain motion vector prediction of the filtered adjacent blocks and a coordinate position of the current block in the coding unit; and deriving motion vectors of the current block according to the reference motion vectors and the coordinate position of the current block in the coding unit.

According to the at least one technical solution in the embodiments of the present disclosure, following beneficial effects can be realized:

according to the present disclosure, a space domain motion vector prediction and a time domain motion vector prediction of adjacent blocks of the coding unit are obtained in the predetermined direction; filtering operation is performed on the space domain motion vector prediction and the time domain motion vector prediction to obtain the space domain motion vector prediction and the time domain motion vector prediction of the filtered adjacent blocks; reference motion vectors of the current block in the four sides is determined by using the space domain motion vector prediction and the time domain motion vector prediction of the filtered adjacent blocks and the coordinate position of the current block in the coding unit, according to a predetermined inter-frame prediction mode; and motion vectors of the current block are derived according to the reference motion vectors and the coordinate position of the current block in the coding unit. Based on the technical solutions of the present disclosure, the accuracy of inter-frame prediction can be improved, and the encoding efficiency can be further improved.

BRIEF DESCRIPTION OF THE DRAWINGS

In order to describe the embodiments of the present disclosure or the technical solutions in the related art more clearly, a brief introduction regarding the accompanying drawings that need to be used for describing the embodiments of the present disclosure or the related art is given below; it is apparent that the accompanying drawings described below are only some embodiments of the present disclosure, a skilled person in the art can also obtain other drawings according to the current drawings without paying creative labor.

DESCRIPTION OF THE EMBODIMENTS

Figure 1:
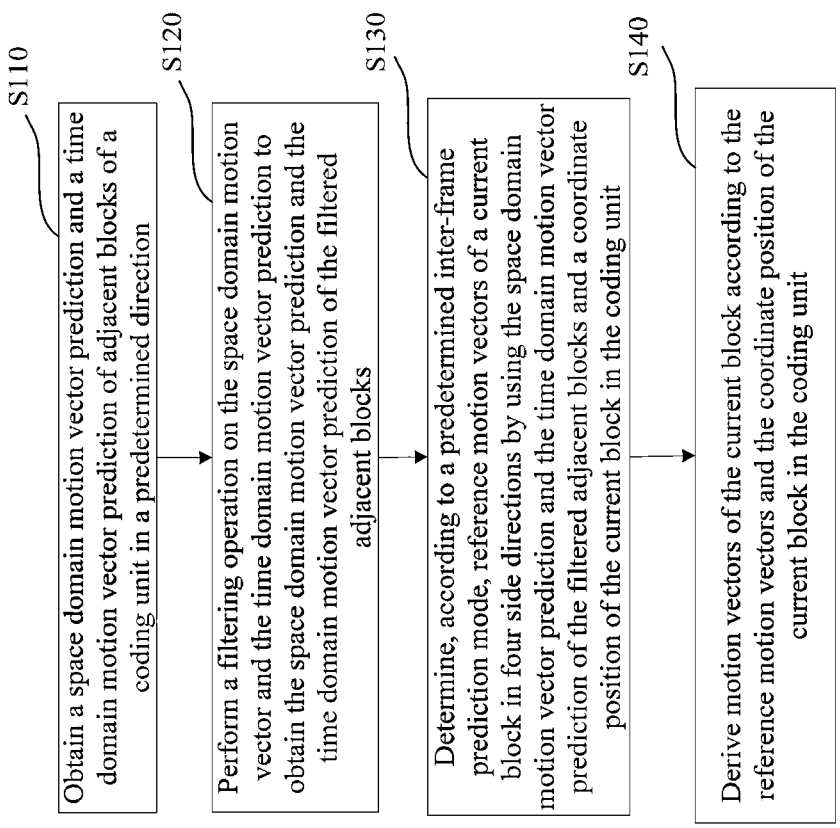
FIG. 1 illustrates a schematic flow diagram of a method for deriving motion vector according to one embodiment of the present disclosure.

In order to make the technical solutions of the description of the present disclosure be more understandable, the technical solutions in the embodiments of the description of the present disclosure will be described clearly and comprehensively with reference to the accompanying figures in the embodiments of the description of the present disclosure. It is apparent that, the embodiments described below are merely some embodiments of the present disclosure, rather than all embodiments of the present disclosure. Based on the embodiments in the description of the present disclosure, all other embodiments which are obtained by the person of ordinary skill in the art at without paying creative labor should all be included in the protection scope of the present disclosure.

The commonly used methods for compressing video data include HEVC, AVS and H.264/MPEG-4 AVC, etc. According to these methods, one image is divided into a plurality of macroblocks to encode the image, a prediction block is generated using inter-frame prediction or intra prediction, so that the corresponding macroblock is encoded. The difference between the initial block and the prediction block is transformed to generate a transform block, and the transform block is quantized with a quantization parameter and a quantization matrix. A quantization coefficient of the quantization block is scanned through a predetermined scan mode, and an entropy encoding is performed subsequently. Quantization parameters are adjusted for each macroblock, and the macroblock is encoded using the previous quantization parameters.

In a video, there is a strong correlation between the adjacent blocks in time domain and the adjacent blocks in space domain, and the current coding block, and there is a strong correlation between the motion vectors of the adjacent blocks in time domain and the adjacent blocks in space domain, and the current coded block, therefore, the motion vector of the current coding block may be derived with reference to the motion vectors of the adjacent blocks in time domain and the adjacent blocks in space domain, thereby saving overhead of code rate of direct transmission of motion vectors, and improving a coding efficiency.

In the aforesaid video encoding method, a plurality of modes including a Skip Direct mode, a Merge mode are used to encode the current coding unit, these modes directly derive motion information of the current coding unit by using the motion information of the adjacent encoded blocks in the space domain and the motion information in the encoded image in the time domain, these modes do not obtain the motion information by performing motion estimation, so that the accuracy of inter-frame prediction is reduced; in addition, the existing modes finally derive all motion information of the current coding unit, however, sub-blocks in each coding unit cannot be accurately derived, so that the accuracy of inter-frame prediction is further reduced, and the coding efficiency is further affected.

The following embodiments of the description of the present disclosure are illustrated by taking a video encoding, and particularly an inter-frame prediction process of video encoding as an application scenario, however, the embodiments of the description of the present disclosure are not limited to the following application scenarios, and the following scenarios do not constitute a limitation to the protection scope of the embodiments of the description of the present disclosure.

FIG. 1 illustrates a schematic flow diagram of a method for deriving motion vector according to an embodiment of the present disclosure. This method may include the following steps:

At step S110, a space domain motion vector prediction and a time domain motion vector prediction of adjacent blocks of the coding unit in a predetermined direction are obtained.

In one or more embodiments of the description of the present disclosure, a CU (Coding Unit) may refer to some rectangular blocks which have certain sizes and do not overlap with each other, by dividing a frame of image into a plurality of rectangular blocks with a certain size, each block is a maximum coding unit, and each maximum coding unit may further be divided into coding units of different sizes and having the number from 64*64 to 8*8; and the coding unit has unique prediction mode information, coefficient, etc.

In one or more embodiments of the description of the present disclosure, the step of obtaining the space domain motion vector of the adjacent blocks of the coding unit in the predetermined direction may include the following process:

the motion vectors of adjacent blocks located at the left side and the upper side of the coding unit are scaled to obtain space domain motion vectors of the adjacent blocks; specifically, the forward motion vectors of the adjacent blocks are scaled into the first frame of the forward reference frame list, the backward motion vectors of the adjacent blocks are scaled into the first frame of the backward reference frame list, and the scaled motion vectors are taken as the space domain motion vectors of the adjacent blocks.

Furthermore, the adjacent blocks refer to the adjacent coding blocks of the current coding block in the left direction, the right directions, the upper direction and the lower direction, the adjacent blocks do not belong to the coding blocks inside the current coding unit, and the sizes of the adjacent blocks are the same as the size of the current block in the coding unit. In a practical application, the adjacent blocks from which the space domain motion vectors are derived may be the adjacent blocks in the left side direction and the upper side direction of the current coding unit, and the space domain motion vectors of the adjacent blocks are obtained by scaling the motion vectors of the adjacent blocks, that is, the space domain motion vectors are the result obtained after scaling the motion vectors. The motion vectors herein refers to the motion vectors at the left side and the upper side of the encoded adjacent blocks, the motion vectors may also be represented by motion information.

The scaling process may include: scaling the forward motion vector of the adjacent blocks into the first frame of the forward reference frame list, and scaling the backward motion vectors of the adjacent blocks into the first frame of the backward reference frame list, so that the space domain motion vectors of the adjacent blocks may be obtained by calculating a scaling result of the forward motion vector and the backward motion vector; for the adjacent blocks of which motion vectors are unavailable, the adjacent blocks with the closest spatial position is searched from the adjacent blocks with available space domain motion vectors, and the searched adjacent blocks are scaled, and the space domain motion vectors of the scaled adjacent blocks are taken as the space domain motion vectors thereof.

Two reference frame lists are included in the video encoding technology, the two reference frame lists are the forward reference frame list and the backward reference frame list respectively, the two reference frame lists store reestablished encoded images in a certain order, and these images may be selected as reference frames by the interframe prediction mode of the current coding unit. The first frame may refer to an image which has a reference frame index of 0 in the reference frame list.

In one or more embodiments of the description of the present disclosure, obtaining a time domain motion vector prediction of the adjacent blocks of the coding unit in a predetermined direction may include the following process:

obtain time domain motion vector predictions of the adjacent blocks located at the right side and the lower side of the coding unit; specifically, a motion vector of the coding block which has the same coordinate position as the adjacent blocks is obtained from the first frame of the forward reference frame list or the first frame of the backward reference frame list, and the motion vector of the coding block is scaled to obtain the time domain motion vector predictions of the adjacent blocks.

Furthermore, the adjacent blocks from which time domain motion vector prediction is derived may be the adjacent blocks in the right side direction and the lower side direction of the current coding unit, the time domain motion vector prediction of the adjacent blocks is realized by obtaining motion information of a block which has the same coordinate position as the coding unit in which the adjacent block is located from other encoded images in the time domain, and taking the result of the scaled motion information as the time domain motion vector prediction of the adjacent block. A block which has the same coordinate position as the current adjacent block in other encoded images in the time domain is referred to as a Co-located block, and the time domain motion vector prediction is deriving the motion information of the adjacent blocks by scaling the motion information of the Co-located block. For the adjacent blocks of which time domain motion vectors are unavailable, an adjacent block which is closest to the current coding unit in spatial position is found from the adjacent blocks which are adjacent to the current coding unit and have available time domain motion vector prediction, and the time domain motion vector prediction of the found adjacent block is taken as the time domain motion vector prediction thereof.

Figure 2:
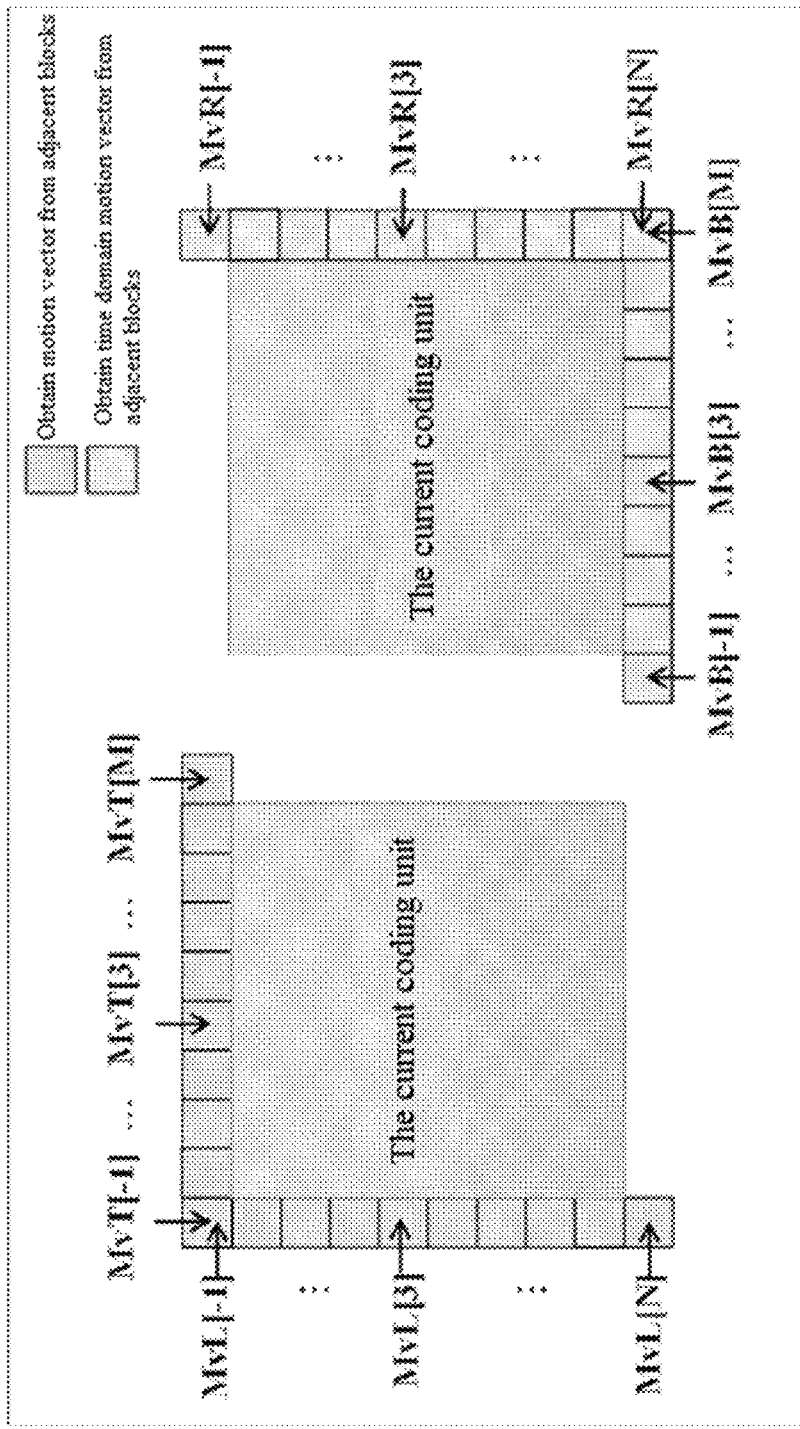
FIG. 2 illustrates a schematic diagram of positions and structures of adjacent blocks according to one embodiment of the present disclosure, wherein the space domain motion vector and the time domain motion vector prediction of the adjacent blocks are obtained.

As shown in FIG. 2, FIG. 2 illustrates a schematic diagram of position and structure of adjacent blocks from which space domain motion vector and time domain motion vector are obtained; wherein the left side in FIG. 2 reflects a position relationship between the adjacent blocks from which the space domain motion vector is obtained, and the coding unit, it can be seen that the adjacent blocks from which the space domain motion vectors are obtained are the adjacent blocks located at the left side and the upper side of the coding unit; the right side in FIG. 2 reflects a position relationship between the adjacent blocks from which time domain motion vectors are obtained, and the coding unit, it can be seen that the adjacent blocks from which time domain motion vector predictions are obtained are the adjacent blocks located at the right side and the lower side of the coding unit.

It is worth noting that, since the encoding is performed in a certain order, most of the sub-blocks located at the left side and the upper side of the current coding unit have been encoded, and the motion information of these sub-blocks is available; however, the sub-blocks located at the right side and the lower side of the current coding unit haven't been encoded, so that the motion information of these sub-blocks is not available. Therefore, in practical operation, the derived space domain motion vectors are space domain motion vectors of the coded adjacent blocks located at the left side and upper side of the current coding unit, regarding the right side and the lower side, the time domain motion vector prediction is obtained from other encoded images by using time domain motion vector prediction technique.

At step S120, a filtering operation is performed on the space domain motion vector and the time domain motion vector prediction to obtain a space domain motion vector and a time domain motion vector prediction of the filtered adjacent block.

In one or more embodiments of the description of the present disclosure, the step of performing filtering operation on the derived space domain motion vector and the derived time domain motion vector prediction of the adjacent block in step S110, may include the two steps listed as follows:

in a first step, a filling operation is performed on both ends of the space domain motion vector and the time domain motion vector prediction, and the detail of filling operation includes the following contents:

$MvT[i]=MvT[0], MvT[j]=MvT[M-1], -2 \leq i<0, M \leq j<M+2$ $MvB[i]=MvB[0], MvB[j]=MvB[M-1], -2 \leq i<0, M \leq j<M+2 MvL[k]=MvL[0],$ $MvL[1]=MvL[N-1], -2 \leq k<0, N \leq 1<N+2 MvR[k]=MvR[0], MvR[1]=MvR[N-1], -2 \leq k<0, N \leq 1<N+2$ Where, MvR and MvB represent time domain motion vector predictions of the adjacent blocks which are located at the front right side and the lower side respectively and are not filtered; MvL and MvT respectively represent space domain motion vectors of the adjacent blocks which are located at the left side and the upper side respectively and are not filtered; i and j represent column coordinates in units of sub-block; k and 1 represent row coordinates in units of sub-block; M and N represent the width and the height of the coding unit in units of sub-block.

In a practical application scenario, since motion vectors beyond the outermost two ends of the adjacent blocks may be used in the process of performing filtering operation on the space domain motion vectors and time domain motion vectors of the adjacent blocks, and the motion vectors of these blocks may not be obtained, so that motion vectors of endmost adjacent blocks may be used for vector filling.

In a second step, the space domain motion vector and the time domain motion vector prediction are filtered according to the following formula:

$$Mvt[x]=(3*MvT[i_0]+8*MvT[i_1]+10*MvT[i_2]+8*MvT[i_3]+3*MvT[i_4])>>5$$

$$Mvl[y]=(3*MvL[j_0]+8*MvL[j_1]+10*MvL[j_2]+8*MvL[j_3]+3*MvL[j_4])>>5 Mvb[x]=(3*MvB[i_0]+8*MvB[i_1]+10*MvB[i_2]+8*MvB[i_3]+3*MvB[i_4])>>5 Mvr[y]=(3*MvR[j_0]+8*MvR[j_1]+10*MvR[j_2]+8*MvR[j_3]+3*MvR[j_4])>>5$$

$$1 \le x \le M$$

$$1 \le y \le N$$

Where, MvR and MvB represent the time domain motion vector predictions of the adjacent blocks which are located at a right side and a lower side respectively and are not filtered; Mvr and Mvb represent the time domain motion vector predictions of the adjacent blocks which are located at a right side and a lower side respectively and are filtered; MvL and MvT represent the space domain motion vectors of the adjacent blocks which are located at a left side and an upper side respectively and are not filtered; Mvl and Mvt represent the space domain motion vector of the adjacent blocks which are located at the left side and the upper side respectively and are filtered; x and y represent a coordinate of the current block in the coding unit in units of sub-block; i and j represent a column coordinate in units of sub-block; and M and N represent a width and a height of the coding unit in units of sub-block.

At step S130, reference motion vectors of the current block in four side directions of the current block are determined using the space domain motion vector and the time domain motion vector prediction of the filtered adjacent blocks and a coordinate position of the current block in the coding unit, according to a predetermined inter-frame prediction mode.

One embodiment of the description of the present disclosure provides five new inter-frame prediction modes, including: a first inter-frame prediction mode, a second inter-frame prediction mode, a third inter-frame prediction mode, a fourth inter-frame prediction mode, and a fifth inter-frame prediction mode.

Figure 3:
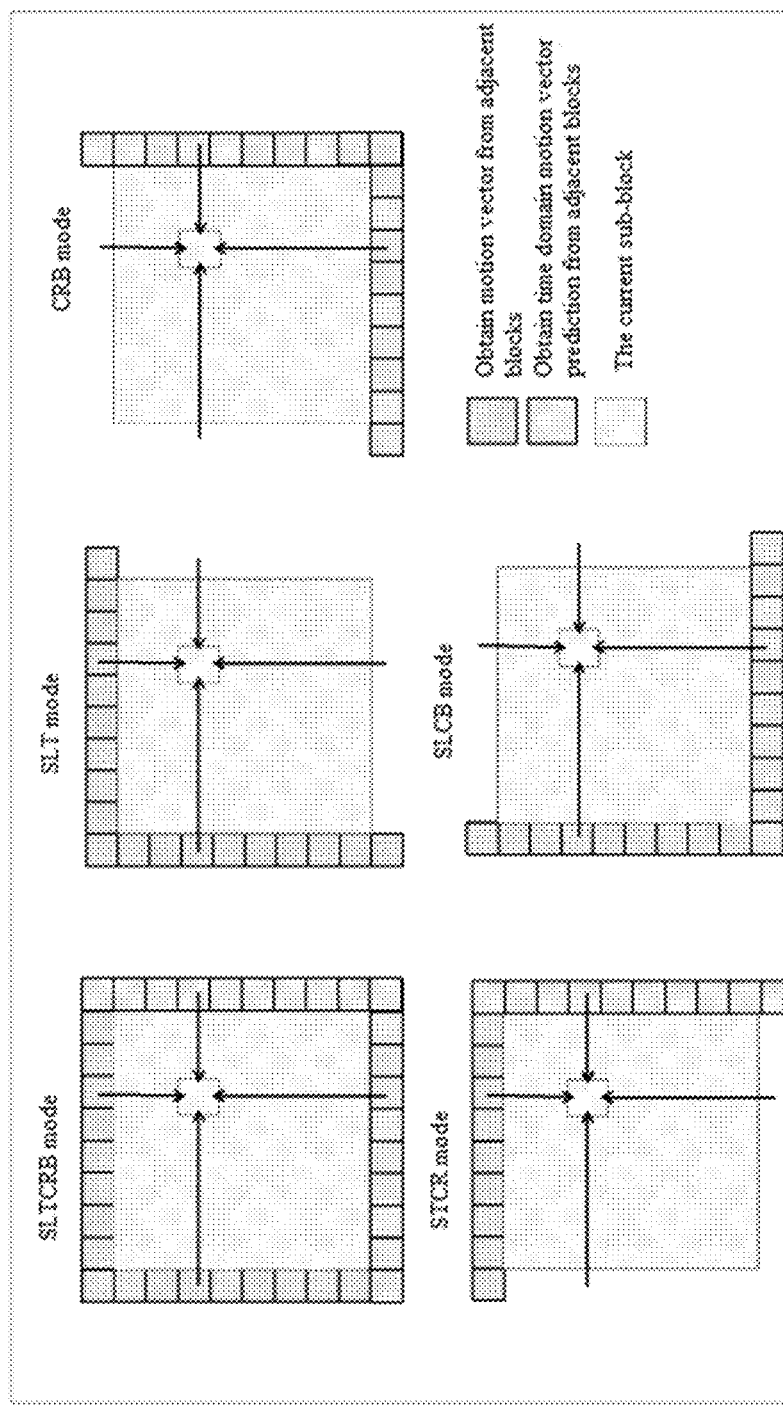
FIG. 3 illustrates a schematic diagram of a working principle of determining reference motion vectors of the current block in the four sides using five inter-frame prediction modes according to one embodiment of the present disclosure and FIG. 4 illustrates a schematic block diagram of an electronic device according to one embodiment of the present disclosure.

Furthermore, as shown in FIG. 3, FIG. 3 illustrates a schematic diagram of a working principle of determining the reference motion vectors of the current block in four side directions of the current block according to the embodiment of the description of the present disclosure; referring to FIG. 3, the determination of the reference motion vectors of the current block in the four sides of the current block according to the five new inter-frame prediction modes may include the following content:

select a left side adjacent block and a right side adjacent block in a horizontal coordinate direction of the current block, and select an upper side adjacent block and a lower side adjacent block in a vertical coordinate direction of the current block, and take a space domain motion vector of the filtered left side adjacent block and a space domain motion vector of the filtered upper side adjacent block, a time domain motion vector prediction of the filtered right side adjacent block and a time domain motion vector prediction of the filtered lower side adjacent block as the reference motion vectors of the current block in the four side-side directions thereof respectively, when the first inter-frame prediction mode is adopted;

select a left side adjacent block in the horizontal coordinate direction of the current block and a lower side adjacent block in the vertical coordinate direction of the current block, and take a space domain motion vector of the filtered left side adjacent block and a time domain motion vector prediction of the filtered lower adjacent block as reference motion vectors of the current block in the left side and the lower side respectively; and take a time domain motion vector prediction of an adjacent block located rightmost at the lower side of the filtered coding unit and a space domain motion vector of an adjacent block located uppermost at the left side of the filtered coding unit as the reference motion vectors of the current block in the right side direction and the upper side direction respectively, when the second inter-frame prediction mode is adopted;

select a right side adjacent block in the horizontal coordinate direction of the current block and an upper adjacent block in the vertical coordinate direction of the current block, and take a time domain motion vector prediction of the filtered right side adjacent block and a space domain motion vector of the filtered upper side adjacent block as reference motion vectors of the current block in the right side direction and the upper side direction, respectively; and take a space domain motion vector of an adjacent block located left-most at the upper side of the filtered coding unit and the a time domain motion vector prediction of an adjacent block located lowermost at the right side of the filtered coding unit as the reference motion vectors of the current block in the left-side direction and the lower-side direction respectively, when the third inter-frame prediction mode is adopted;

select the left side adjacent block in the horizontal coordinate direction of the current block and the upper adjacent block in the vertical coordinate direction of the current block, and take a space domain motion vector of the filtered left side adjacent block and a space domain motion vector of the filtered upper side adjacent block as reference motion vectors of the current block in the left side direction and the upper side direction; and take a space domain motion vector of the adjacent block located rightmost at the upper side of the filtered coding unit and a space domain motion vector of the adjacent block located lowermost at the left side of the filtered coding unit as the reference motion vectors of the current block in the right side direction and the lower side direction respectively, when the fourth inter-frame prediction mode is adopted;

select the right side adjacent block in the horizontal coordinate direction of the current block and the lower side adjacent block in the vertical coordinate direction of the current block, and take the time domain motion vector prediction of the filtered right side adjacent block and the time domain motion vector prediction of the lower side adjacent block as reference motion vectors of the current block in the right side direction and the lower side direction, respectively; and take the time domain motion vector prediction of the adjacent blocks located leftmost at the lower side of the filtered coding unit and the time domain motion vector prediction of the adjacent block located uppermost at the right side of the filtered coding unit as the reference motion vectors of the current block in the left side direction and the upper side direction respectively, when the fifth inter-frame prediction mode is adopted.

In this embodiment of the description of the present disclosure, according to the aforesaid five new inter-prediction modes, the reference motion vectors of the sub-blocks in the current coding unit are derived by using a bilinear interpolation method in combination with the space domain motion information and the time domain motion information of the adjacent blocks of the current coding unit. Therefore, in practical applications, the current block with a coordinate (x,y) is taken as an example, for each of the five inter-frame prediction modes described above, four motion vectors may be selected as reference motion vectors of the current coding unit in the four directions of left direction, right direction, upper side direction and lower side direction respectively according to a formula listed below:

a) the first inter-frame prediction mode vl=Mvl[y]

$$vt=Mvt[x]$$

$$vr=Mvr[y]vb=Mvb[x]$$

b) the second inter-frame prediction mode vl=Mvl[y]

$$vt=Mvl[-1]$$

$$vr=Mvb[M]vb=Mvb[x]$$

c) the third inter-frame prediction mode vl=Mvt[−1]

$$vt=Mvt[x]$$

$$vr=Mvr[y]vb=Mvr[N]$$

d) the fourth inter-frame prediction mode vl=Mvl[y]

$$vt=Mvt[x]$$

$$vr=Mvt[M]vb=Mvl[N]$$

e) the fifth inter-frame prediction mode vl=Mvb[−1]

$$vt=Mvr[-1]$$

$$vr=Mvr[y]vb=Mvb[x]$$

Where, vl, vr, vt, and vb respectively represent the reference motion vectors in the left direction, in the right direction, in the upper direction and in the lower direction of the current block in the coding unit; Mvr and Mvb respectively represent the space domain motion vectors of the filtered adjacent blocks located at the right side and the lower side; Mvl and Mvt represent the space domain motion vector of the adjacent blocks located at the left side and the upper side of the current block, respectively; X and Y represent a coordinate of the current block in units of sub-block in the coding unit; X=0 represents the first column of sub-blocks in the current coding unit, and Y=0 represents the first row of sub-blocks in the current coding unit; M and N represents the width and the height of the coding unit in units of sub-block.

At step S140, the motion vector of the current block is derived according to the reference motion vector and the coordinate position of the current block in the coding unit.

In one or more embodiments of the description of the present disclosure, the motion vector of the current block may be derived according to the reference motion vectors determined in step S130 in combination with the coordinate position of the current block in the coding unit, and according to the following formula listed below:

$$V_h=((M-x)*vl+X*vr)/M$$

$$V_v=((N-y)*vt+y*vb)/N \ V[x][y]=(V_h+V_v)/2$$

Where, vl, vr, vt, and vb represent the reference motion vectors of the current block in the left direction, in the right direction, in the upper direction and in the lower direction, respectively; x and y represent a coordinate of the current block in the coding unit in units of sub-block; M and N represent a width and a height of the coding unit in units of sub-block; Vl, represents a horizontal motion vector of the current block; $V_v$ represents a vertical motion vector of the current block; V[x][y] represents motion vectors of the current block.

Furthermore, after the motion vectors of the current block are derived using the bilinear interpolation based on the above five new inter-frame prediction modes, the inter-frame prediction mode may also be marked in encoded code stream, and the detail of a marking process may include the following contents:

The five new inter-frame prediction modes proposed in the description of the present disclosure are grouped into a mode candidate list, for each coding unit, 1 bit identifier is required to be transmitted to the code stream at the encoding end to identify whether the inter-frame prediction method is selected, if the inter-frame prediction method is selected, an index of the selected inter-frame prediction mode in the mode candidate list needs to be transmitted, and a binarized result of the index is transmitted to the code stream so as to identify the selected inter-frame prediction mode. At the decoding end, it needs to decode the 1 bit identifier to determine whether the inter-frame prediction method is used, if the aforesaid inter-frame prediction method is used, the decoding end further needs to decode the index, and the index is used to determine which of the five new inter-frame prediction modes the inter-frame prediction method belongs to.

Furthermore, based on the method for deriving motion vector provided in the steps S110-S140, one embodiment of the description of the present disclosure further provides a process for performing a rate-distortion optimization decision on each coding unit at the encoding end, which includes the following contents:

1) the space domain motion vectors of the adjacent blocks located at the left side and the upper side of the current coding unit and the time domain motion vector predictions of the adjacent blocks located at the right side and the lower side of the current coding unit are derived for each inter-frame prediction direction, according to step S110.

2) the space domain motion vector and the time domain motion vector prediction are filtered according to step S120.

3) for the five new inter-frame prediction modes proposed in the description of the present disclosure, the motion vectors of the sub-blocks in the current coding unit are derived using each of the five modes, and prediction blocks are derived from the sub-blocks according to the motion vectors, according to step S130 and step S140.

4) whether to use one of the five new inter-frame prediction modes is determined by means of RDO decision, and the encoding end identifies and indexes the inter-frame prediction modes after the RDO decision.

Corresponding to the process at the encoding end, following steps are performed on each coding unit at the decoding end:

1) determine whether to use one of the five new inter-frame prediction modes according to the method for decoding the identifier and the index of the inter-frame prediction mode; if one of the five new inter-frame prediction modes is used, continue to perform the following steps; ends operation if none of the five new inter-frame prediction modes is used.
2) derive the space domain motion vector of the adjacent blocks located at the left side and the upper side of the current coding unit, and derive the time domain motion vector prediction of the adjacent blocks located at the right side and the lower side of the current coding unit for each inter-frame prediction direction, according to step S110.
3) filter the space domain motion vector and the time domain motion vector prediction according to step S120.
4) select a corresponding new inter-frame prediction mode to derive motion vectors of the sub-blocks in the current coding unit, and derive a prediction block from each of the sub-blocks according to the motion vectors, according to step S130 and step 140.
5) obtain a reestablished coding block through reestablishing.

Figure 4:
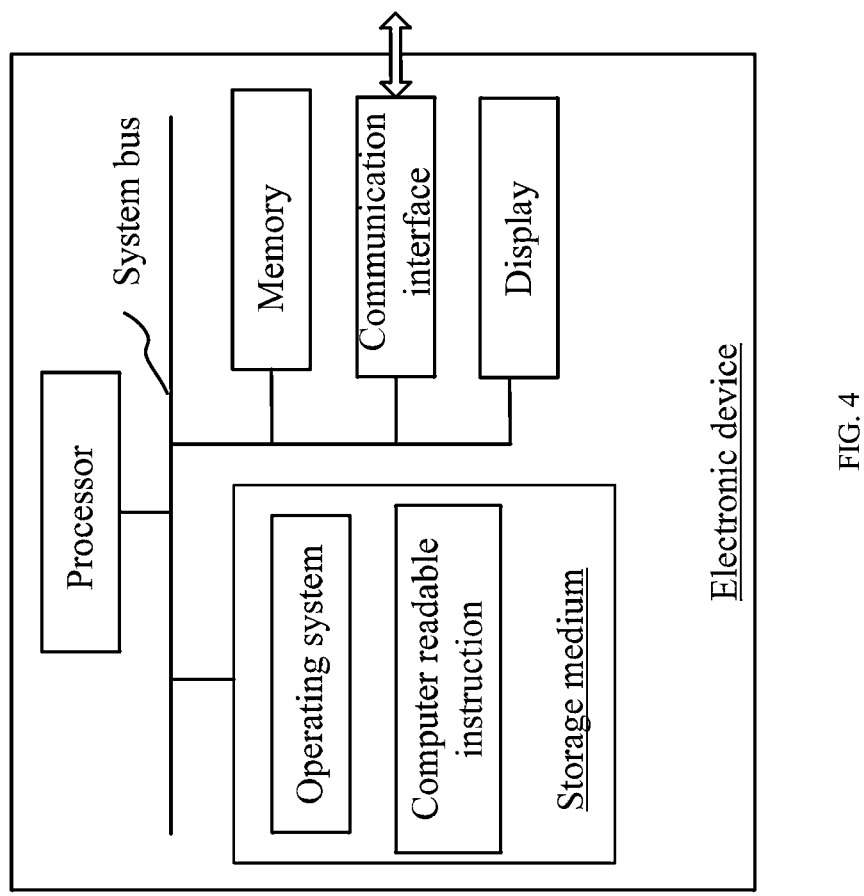

An electronic device is further provided in one embodiment of the present disclosure, as shown in FIG. 4, the electronic device at least includes: a memory, a processor, and a computer program stored in the memory and executable by the processor, when the computer program is executed by the processor, the processor is caused to implement the method for deriving motion vector in the method embodiment described above.

The specific embodiments of the description of the present disclosure are described above. Other embodiments are included in the scope of the appended claims. In some cases, the actions or steps recited in the claims may be performed in an order different from the order in the embodiments and can still achieve desirable results. In addition, the processes depicted in the figures can be performed to achieve the desirable results without necessarily in the stipulated order or sequential order shown in the figures. In some embodiments, multitasking and parallel processing are also possible or may be beneficial.

The embodiments in the description of the present disclosure are described in a progressive manner, regarding the same or similar parts among these embodiments, reference can be made to each other, each embodiment focuses on the differences from other embodiments. In particular, for the electronic device embodiment, since the electronic device embodiment is substantially similar to the method embodiment, so that the descriptions of the electronic device embodiments are relatively simple, regarding the relevant part, reference can be made to the description of the corresponding part in the method embodiment.

The electronic device corresponds to the method provided in the embodiments of the description of the present disclosure, therefore, the electronic device has the beneficial technical effects similar to that of the corresponding method. Since the beneficial technical effects of the method have been described in detail above, the beneficial technical effects of the electronic device are not repeatedly described herein.

This description is described with reference to the flow diagram and/or block diagrams of the method, the device (system), and the computer program product according to the embodiments of the present disclosure. It should be understood that each process and/or block in the flow diagram and/or the block diagram, and the combination of the processes and/or blocks in the flow diagram and/or the block diagram may be implemented by computer program instructions. These computer program instructions may be provided to a processor of a general purpose computer, a special purpose computer, an embedded processor, or other programmable data processing device to produce a machine, such that a device which has the functions specified in one or more process(es) of the flow diagram and/or one or more block(s) of the block diagram can be generated by the instructions executed by the processor of the computer or other programmable data processing device.

It also needs to be noted that, terms "comprising", "including" or any other variation are intended to cover a non-exclusive inclusion, so that a process, a method, goods, or a device which includes a series of elements not only includes the elements, but also includes other elements that are not expressly listed, or includes the elements inherent to such process, method, goods, or device. In the absence of more limitations, an element which is defined by a sentence "includes one . . . " does not exclude a presence of additional identical elements in the process, the method, the goods, and the device which include the elements.

the description of the present disclosure may be described in the general context of computer-executable instructions executed by a computer, computer-executable instructions can be such as program modules. Generally, the program modules include routines, programs, objects, components, data structures for performing particular tasks or implement particular abstract data types. The present disclosure may also be practiced in a distributed computing environments where tasks are performed by a remote processing device connected through a communication network. In the distributed computing environment, the program modules may be located in the local computer storage media and the remote computer storage media which include a storage device.

The above descriptions of the embodiments disclosed in the present disclosure enable the person of ordinary skill in the art to make or use the present disclosure. Various modifications to these embodiments will be readily apparent to those skilled in the art, the generic principles defined herein may be implemented in other embodiments without departing from the spirit and the scope of the present disclosure. Thus, the present disclosure will not be limited to these embodiments shown herein but instead should be in accordance with the broadest scope consistent with the principles and novel features disclosed herein.

What is claimed is:

1. A method for deriving motion vector from a current block in a coding unit, implemented by an electronic device comprising a memory, a processor and a computer program stored in the memory and executable by the processor, the method comprising:
   obtaining a space domain motion vector prediction and a time domain motion vector prediction of adjacent blocks of the coding unit in a predetermined direction;
   filtering on the space domain motion vector and the time domain motion vector prediction to obtain the space domain motion vector prediction and the time domain motion vector prediction of the filtered adjacent blocks;
   determining, according to a predetermined inter-frame prediction mode, reference motion vectors of the current block in four side directions by using the space domain motion vector prediction and the time domain motion vector prediction of the filtered adjacent blocks and a coordinate position of the current block in the coding unit; and deriving motion vectors of the current block according to the reference motion vectors and the coordinate position of the current block in the coding unit, the deriving comprising:

deriving motion vectors of the current block according to the formula listed below:

$$V_h=((M-x)*vl+X*vr)/M$$

$$V_v=((N-y)*vt+y*vb)/N$$

$$V[x][y]=(V_h+V_v)/2$$

wherein vl, vr, vt, and vb represent the reference motion vectors of the current block in the left direction, in the right direction, in the upper direction and in the lower direction, respectively, x and y represent a coordinate of the current block in the coding unit in units of sub-block; M and N represent a width and a height of the coding unit in units of sub-block; $V_h$ represents a horizontal motion vector of the current block, $V_v$ represents a vertical motion vector of the current block, and V[x][y] represents motion vectors of the current block.

2. The method according to claim 1, wherein the obtaining of the space domain motion vector of the adjacent blocks of the coding unit in the predetermined direction comprises a step of:

scaling motion vectors of adjacent blocks respectively located at a left side and an upper side of the coding unit to obtain the space domain motion vectors of the adjacent blocks by:

scaling a forward motion vector of the adjacent blocks into a first frame of a forward reference frame list, scaling a backward motion vector of the adjacent blocks into a first frame of a backward reference frame list, and using the scaled motion vectors as the space domain motion vectors of the adjacent blocks.

3. The method according to claim 1, wherein the step of obtaining of the time domain motion vector prediction of the adjacent blocks of the coding unit in the predetermined direction comprises:

obtaining time domain motion vector prediction of the adjacent blocks located at a right side and a lower side of the coding unit by:

obtaining, from a first frame of a forward reference frame list or a first frame of a backward reference frame list, a motion vector of a coding block which has the same coordinate position as the adjacent blocks, and scaling the motion vector of the coding block which has the same coordinate position as the adjacent blocks to obtain the time domain motion vector prediction of the adjacent blocks.

4. The method according to claim 1, wherein filtering on the space domain motion vector and the time domain motion vector prediction particularly comprises:

vector filling on both ends of the space domain motion vector and the time domain motion vector prediction, and filtering on the space domain motion vector and the time domain motion vector prediction according to a formula listed below:

$$Mvt[x]=(3*MvT[i_0]+8*MvT[i_1]+10*MvT[i_2]+8*MvT[i_3]+3*MvT[i_4])>>5$$

$$Mvl[y]=(3*MvL[j_0]+8*MvL[j_1]+10*MvL[j_2]+8*MvL[j_3]+3*MvL[j_4])>>5$$

$$Mvb[x]=(3*MvB[i_0]+8*MvB[i_1]+10*MvB[i_2]+8*MvB[i_3]+3*MvB[i_4])>>5$$

$$Mvr[y]=(3*MvR[j_0]+8*MvR[j_1]+10*MvR[j_2]+8*MvR[j_3]+3*MvR[j_4])>>5$$

$$1 \leq x \leq M$$

$$1 \leq y \leq N,$$

wherein

MvR and MvB represent the time domain motion vector predictions of the adjacent blocks which are located at a right side and a lower side respectively and are not filtered, Mvr and Mvb represent the time domain motion vector predictions of the adjacent blocks which are located at a right side and a lower side respectively and are filtered, MvL and MvT represent the space domain motion vectors of the adjacent blocks which are located at a left side and an upper side respectively and are not filtered, Mvl and Mvt represent the space domain motion vector of the adjacent blocks which are located at the left side and the upper side respectively and are filtered, x and y represent a coordinate of the current block in the coding unit in units of sub-block, i and j represent a column coordinate in units of sub-block, and M and N represent a width and a height of the coding unit in units of sub-block.

5. The method according to claim 1, wherein the inter-frame prediction mode comprises:

a first inter-frame prediction mode, a second inter-frame prediction mode, a third inter-frame prediction mode, a fourth inter-frame prediction mode, and a fifth inter-frame prediction mode.

6. The method according to claim 5, wherein the determining, according to the predetermined inter-frame prediction mode, reference motion vectors of the current block in four side directions by using the space domain motion vector prediction and the time domain motion vector prediction of the filtered adjacent blocks and the coordinate position of the current block in the coding unit, comprises:

selecting, when the first inter-frame prediction mode is adopted, a left side adjacent block and a right side adjacent block in a horizontal coordinate direction of the current block; selecting an upper side adjacent block and a lower side adjacent block in a vertical coordinate direction of the current block; and taking a space domain motion vector of the filtered left side adjacent block and a space domain motion vector of the filtered upper side adjacent block, a time domain motion vector prediction of the filtered right side adjacent block and a time domain motion vector prediction of the filtered lower side adjacent block as the reference motion vectors of the current block in the four side-side directions thereof, respectively;

selecting, when the second inter-frame prediction mode is adopted, a left side adjacent block in the horizontal coordinate direction of the current block and a lower side adjacent block in the vertical coordinate direction of the current block; taking a space domain motion vector of the filtered left side adjacent block and a time domain motion vector prediction of the filtered lower adjacent block as reference motion vectors of the current block in the left side and the lower side respectively; and taking a time domain motion vector prediction of an adjacent block located rightmost at the lower side of the filtered coding unit and a space domain motion vector of an adjacent block located uppermost at the left side of the filtered coding unit as the reference motion vectors of the current block in the right side direction and the upper side direction, respectively;

selecting, when the third inter-frame prediction mode is adopted, a right side adjacent block in the horizontal coordinate direction of the current block and an upper adjacent block in the vertical coordinate direction of the current block, taking a time domain motion vector prediction of the filtered right side adjacent block and a space domain motion vector of the filtered upper side adjacent block as reference motion vectors of the current block in the right side direction and the upper side direction, respectively; and taking a space domain motion vector of an adjacent block located left-most at the upper side of the filtered coding unit and the a time domain motion vector prediction of an adjacent block located lowermost at the right side of the filtered coding unit as the reference motion vectors of the current block in the left-side direction and the lower-side direction, respectively;

selecting, when the fourth inter-frame prediction mode is adopted, the left side adjacent block in the horizontal coordinate direction of the current block and the upper adjacent block in the vertical coordinate direction of the current block; taking a space domain motion vector of the filtered left side adjacent block and a space domain motion vector of the filtered upper side adjacent block as reference motion vectors of the current block in the left side direction and the upper side direction; and taking a space domain motion vector of the adjacent block located rightmost at the upper side of the filtered coding unit and a space domain motion vector of the adjacent block located lowermost at the left side of the filtered coding unit as the reference motion vectors of the current block in the right side direction and the lower side direction, respectively; and selecting, when the fifth inter-frame prediction mode is adopted, the right side adjacent block in the horizontal coordinate direction of the current block and the lower side adjacent block in the vertical coordinate direction of the current block; taking the time domain motion vector prediction of the filtered right side adjacent block and the time domain motion vector prediction of the lower side adjacent block as reference motion vectors of the current block in the right side direction and the lower side direction, respectively; and taking the time domain motion vector prediction of the adjacent blocks located leftmost at the lower side of the filtered coding unit and the time domain motion vector prediction of the adjacent block located uppermost at the right side of the filtered coding unit as the reference motion vectors of the current block in the left side direction and the upper side direction, respectively.

7. An electronic device, comprising:
a memory;
a processor; and
a computer program stored in the memory and executable by the processor, wherein when the computer program is executed by the processor the processor is caused to implement a method for deriving motion vector from a current block in a coding unit, the method comprising:
obtaining a space domain motion vector prediction and a time domain motion vector prediction of adjacent blocks of a coding unit in a predetermined direction;
filtering on the space domain motion vector and the time domain motion vector prediction to obtain the space domain motion vector prediction and the time domain motion vector prediction of the filtered adjacent blocks;
determining, according to a predetermined inter-frame prediction mode, reference motion vectors of the current block in four side directions by using the space domain motion vector prediction and the time domain motion vector prediction of the filtered adjacent blocks and a coordinate position of the current block in the coding unit; and
deriving motion vectors of the current block according to the reference motion vectors and the coordinate position of the current block in the coding unit, the deriving being implemented according to the formula listed below:

$$V_h = ((M-x)*vl + X*vr)/M$$

$$V_v = ((N-y)*vt + y*vb)/N$$

$$V[x][y] = (V_h + V_v)/2,$$

wherein,
vl, vr, vt, and vb represent the reference motion vectors of the current block in the left direction, in the right direction, in the upper direction and in the lower direction, respectively,
x and y represent a coordinate of the current block in the coding unit in units of sub-block; M and N represent a width and a height of the coding unit in units of sub-block; $V_h$ represents a horizontal motion vector of the current block,
$V_v$ represents a vertical motion vector of the current block, and
V[x][y] represents motion vectors of the current block.

8. The electronic device according to claim 7, wherein the obtaining of the space domain motion vector of the adjacent blocks of the coding unit in the predetermined direction comprises:
scaling motion vectors of adjacent blocks respectively located at a left side and an upper side of the coding unit to obtain the space domain motion vectors of the adjacent blocks by:
scaling a forward motion vector of the adjacent blocks into a first frame of a forward reference frame list,
scaling a backward motion vector of the adjacent blocks into a first frame of a backward reference frame list, and
using the scaled motion vectors as the space domain motion vectors of the adjacent blocks.

9. The electronic device according to claim 7, wherein the obtaining of the time domain motion vector prediction of the adjacent blocks of the coding unit in the predetermined direction comprises:

obtaining time domain motion vector prediction of the adjacent blocks located at a right side and a lower side of the coding unit by:
  obtaining, from a first frame of a forward reference frame list or a first frame of a backward reference frame list, a motion vector of a coding block which has the same coordinate position as the adjacent blocks, and
  scaling the motion vector of the coding block which has the same coordinate position as the adjacent blocks to obtain the time domain motion vector prediction of the adjacent blocks.

10. The electronic device according to claim 7, wherein the filtering on the space domain motion vector and the time domain motion vector prediction comprises:
  vector filling on both ends of the space domain motion vector and the time domain motion vector prediction, and
  filtering on the space domain motion vector and the time domain motion vector prediction according to a formula listed below:

$$Mvt[x] = (3*MvT[i_0]+8*MvT[i_1]+10*MvT[i_2]+8*MvT[i_3]+3*MvT[i_4]) >> 5$$

$$Mvl[y] = (3*MvL[j_0]+8*MvL[j_1]+10*MvL[j_2]+8*MvL[j_3]+3*MvL[j_4]) >> 5$$

$$Mvb[x] = (3*MvB[i_0]+8*MvB[i_1]+10*MvB[i_2]+8*MvB[i_3]+3*MvB[i_4]) >> 5$$

$$Mvr[y] = (3*MvR[j_0]+8*MvR[j_1]+10*MvR[j_2]+8*MvR[j_3]+3*MvR[j_4]) >> 5$$

$$1 \leq x \leq M$$

$$1 \leq y \leq N,$$

wherein,
    MvR and MvB represent the time domain motion vector predictions of the adjacent blocks which are located at a right side and a lower side respectively and are not filtered,
    Mvr and Mvb represent the time domain motion vector predictions of the adjacent blocks which are located at a right side and a lower side respectively and are filtered,
    MvL and MvT represent the space domain motion vectors of the adjacent blocks which are located at a left side and an upper side respectively and are not filtered,
    Mvl and Mvt represent the space domain motion vector of the adjacent blocks which are located at the left side and the upper side respectively and are filtered,
    x and y represent a coordinate of the current block in the coding unit in units of sub-block,
    i and j represent a column coordinate in units of sub-block, and
    M and N represent a width and a height of the coding unit in units of sub-block.

11. The electronic device according to claim 7, wherein the inter-frame prediction mode comprises:
  a first inter-frame prediction mode, a second inter-frame prediction mode, a third inter-frame prediction mode, a fourth inter-frame prediction mode, and a fifth inter-frame prediction mode.

12. The electronic device according to claim 7, wherein the determining, according to the predetermined inter-frame prediction mode, reference motion vectors of the current block in four side directions by using the space domain motion vector prediction and the time domain motion vector prediction of the filtered adjacent blocks and the coordinate position of the current block in the coding unit by:
  selecting, when the first inter-frame prediction mode is adopted, a left side adjacent block and a right side adjacent block in a horizontal coordinate direction of the current block; selecting an upper side adjacent block and a lower side adjacent block in a vertical coordinate direction of the current block; and taking a space domain motion vector of the filtered left side adjacent block and a space domain motion vector of the filtered upper side adjacent block, a time domain motion vector prediction of the filtered right side adjacent block and a time domain motion vector prediction of the filtered lower side adjacent block as the reference motion vectors of the current block in the four side-side directions thereof, respectively;
  selecting, when the second inter-frame prediction mode is adopted, a left side adjacent block in the horizontal coordinate direction of the current block and a lower side adjacent block in the vertical coordinate direction of the current block; taking a space domain motion vector of the filtered left side adjacent block and a time domain motion vector prediction of the filtered lower adjacent block as reference motion vectors of the current block in the left side and the lower side respectively; and taking a time domain motion vector prediction of an adjacent block located rightmost at the lower side of the filtered coding unit and a space domain motion vector of an adjacent block located uppermost at the left side of the filtered coding unit as the reference motion vectors of the current block in the right side direction and the upper side direction, respectively;
  selecting, when the third inter-frame prediction mode is adopted, a right side adjacent block in the horizontal coordinate direction of the current block and an upper adjacent block in the vertical coordinate direction of the current block; taking a time domain motion vector prediction of the filtered right side adjacent block and a space domain motion vector of the filtered upper side adjacent block as reference motion vectors of the current block in the right side direction and the upper side direction, respectively; and taking a space domain motion vector of an adjacent block located left-most at the upper side of the filtered coding unit and the a time domain motion vector prediction of an adjacent block located lowermost at the right side of the filtered coding unit as the reference motion vectors of the current block in the left-side direction and the lower-side direction, respectively;
  selecting, when the fourth inter-frame prediction mode is adopted, the left side adjacent block in the horizontal coordinate direction of the current block and the upper adjacent block in the vertical coordinate direction of the current block; taking a space domain motion vector of the filtered left side adjacent block and a space domain motion vector of the filtered upper side adjacent block as reference motion vectors of the current block in the left side direction and the upper side direction; and taking a space domain motion vector of the adjacent block located rightmost at the upper side of the filtered coding unit and a space domain motion vector of the adjacent block located lowermost at the left side of the filtered coding unit as the reference motion vectors of the current block in the right side direction and the lower side direction, respectively; and selecting, when the fifth inter-frame prediction mode is adopted, the right side adjacent block in the horizontal coordinate direction of the current block and the lower side adjacent block in the vertical coordinate direction of the current block; taking the time domain motion vector prediction of the filtered right side adjacent block and the time domain motion vector prediction of the lower side adjacent block as reference motion vectors of the current block in the right side direction and the lower side direction, respectively; and taking the time domain motion vector prediction of the adjacent blocks located leftmost at the lower side of the filtered coding unit and the time domain motion vector prediction of the adjacent block located uppermost at the right side of the filtered coding unit as the reference motion vectors of the current block in the left side direction and the upper side direction, respectively.

* * * * *